April 19, 1927.
J. J. KISPERT
1,625,664
COMBINED CORSET AND BRASSIÈRE
Filed May 23, 1925.
2 Sheets-Sheet 1
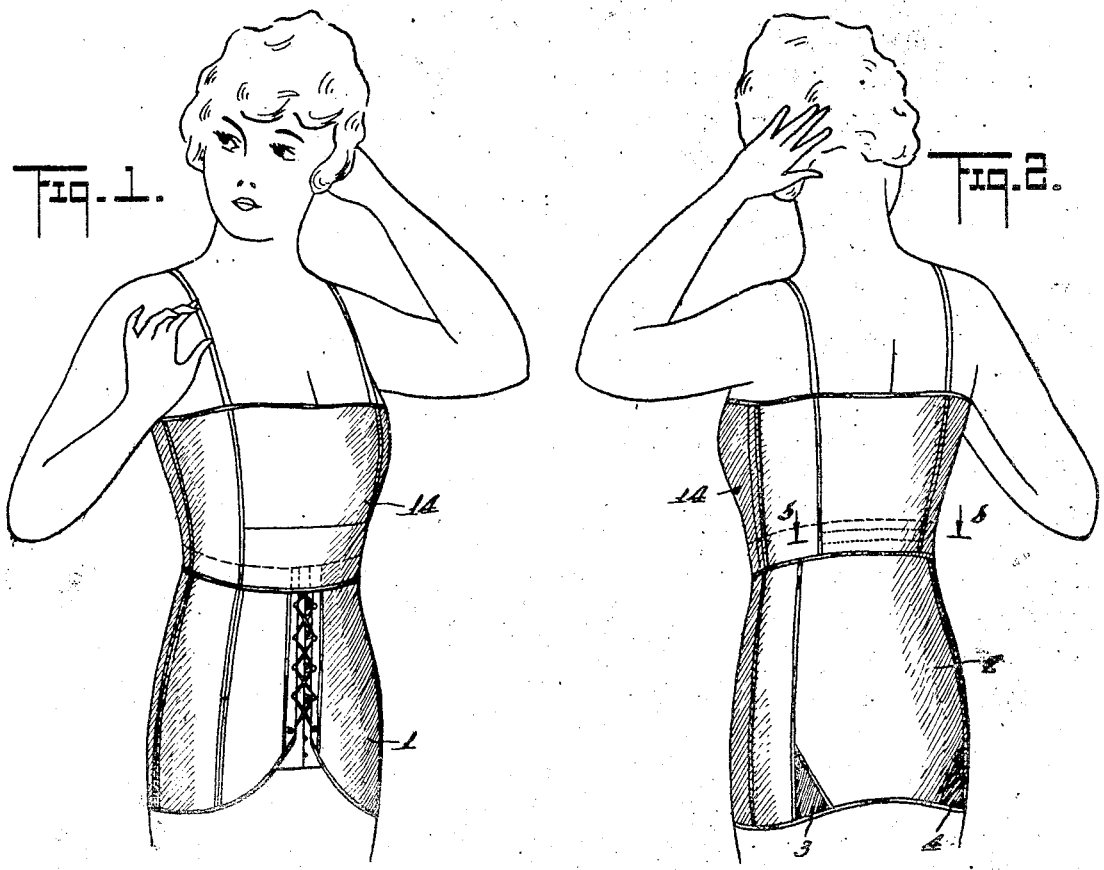
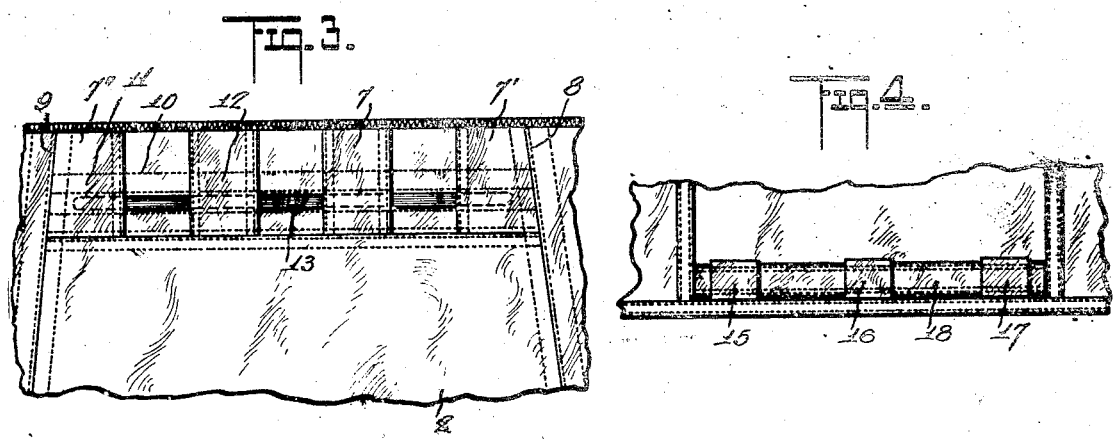
WITNESSES
INVENTOR
Joseph J. Kispert,
BY
ATTORNEYS April 19, 1927.  1,625,664
J. J. KISPERT
COMBINED CORSET AND BRASSIÈRE
Filed May 23, 1925   2 Sheets-Sheet 2
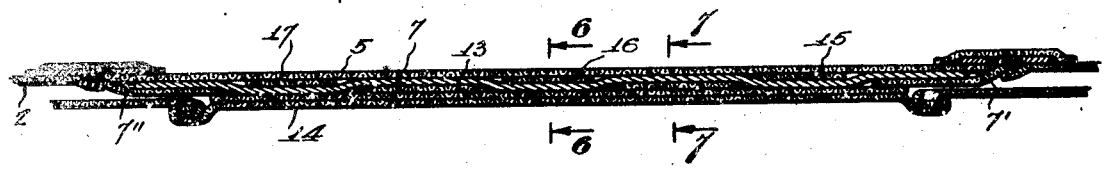
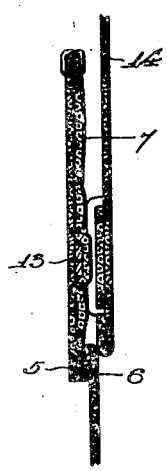
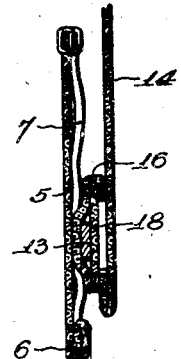
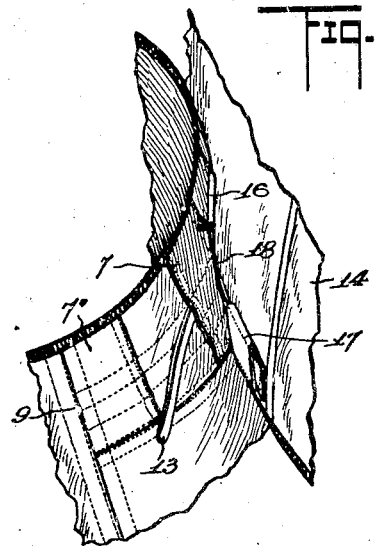
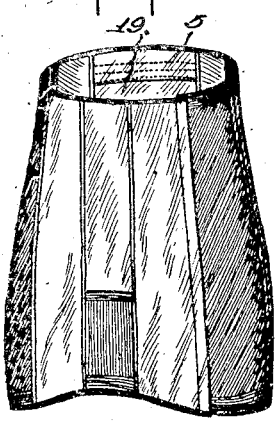
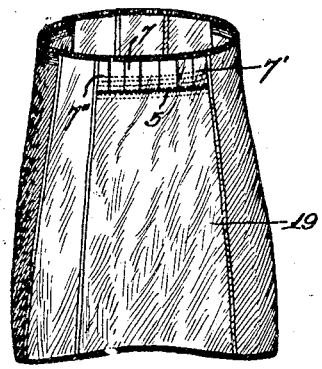
INVENTOR
Joseph J. Kispert,
BY
ATTORNEYS Patented Apr. 19, 1927.

1,625,664

UNITED STATES PATENT OFFICE.

JOSEPH JULIUS KISPERT, OF BRANFORD, CONNECTICUT, ASSIGNOR TO I. NEWMAN & SONS, INC., OF NEW HAVEN COUNTY, CONNECTICUT, A CORPORATION OF CONNECTICUT.

COMBINED CORSET AND BRASSIÈRE.

Application filed May 28, 1925. Serial No. 32,481.

This invention relates to a combined corset and brassière and has for an object to provide an improved construction wherein the usual shaped corset and the usual shaped brassière may be provided and the parts so connected together as to present a substantially uniform appearing garment.

Another object of the invention is to provide a combined brassière and corset wherein the two garments may be disengageably connected together at the back, the connection being so positioned that each garment may function substantially independently while the corset in addition, acts as means for holding the brassière down.

A further object of the invention is to provide a combined brassière and corset with means for removably connecting the two articles together at the back and to associate the brassière with a front lace corset, wrap around corset or other form of corset.

In the accompanying drawings—

Figure 1 is a perspective view of a combined corset and brassière disclosing an embodiment of the invention, the same being shown mounted on a figure.

Figure 2 is a three-fourths rear view of the corset and brassière shown in Figure 1, the same being mounted on a figure.

Figure 3 is an enlarged elevation of the rear part of the corset shown in Figure 1.

Figure 4 is an enlarged interior fragmentary view of the rear lower part of the brassière shown in Figure 1.

Figure 5 is an enlarged fragmentary sectional view through Figure 2, approximately on line 5—5.

Figure 6 is a transverse sectional view through Figure 5 on line 6—6.

Figure 7 is a transverse sectional view through Figure 5 on line 7—7.

Figure 8 is an enlarged detail fragmentary perspective view showing part of the corset and part of the brassière with the connecting member partly inserted.

Figure 9 is a perspective view of a wrap around corset constructed according to the present invention.

Figure 10 is a perspective view showing the rear of the corset illustrated in Figure 9.

Referring to the accompanying drawings by numerals, 1 indicates a front lace corset of any desired type. This corset is provided with a central rear section 2 of fabric of any desired kind and supplied with the usual elastic gussets 3 and 4. The upper part of the section 2 is provided with a special section 5 secured to section 2 by suitable lines of stitching 6. The section 5 carries a number of straps 7, end straps 7' and 7" having their vertical edges stitched down in any desired manner, as for instance, by lines of stitching 8 and 9 whereby when the various lines of stitching 10 are placed in position, pockets 11 will be provided in each of the end straps 7' and 7". The lines of stitching 10 divide up the other straps so as to present a number of passage-ways 12 through which a retaining member 13 may be forced and in which the retaining member may be positioned to connect the corset 1 with the brassière 14.

From Figure 3 it will be noted that the various straps 7 are spaced apart and in the spaces thus provided, straps 15, 16 and 17 connected to the lower edge of the rear part of the brassière 14 are fitted. In order to prevent the retaining member 13 from wearing the material of the brassière 14, a protecting tape 18 is stitched to the brassière. In the particular construction shown in the drawing, there are provided three straps 15, 16 and 17 and, consequently, there are provided four co-acting straps on the corset though it is evident that the number of straps could be varied without departing from the spirit of the invention. Also it is evident that instead of using an ordinary corset steel 13, tape, ribbon or other means might be substituted and act as a connecting member for connecting the parts together. It is to be understood that the straps 7 on the corset are arranged exteriorly thereof while the straps 15, 16 and 17 on the brassière are arranged interiorly thereof so that these straps will readily interlock as shown in Figure 2 so as to connect the two garments together and yet allow both garments to function independently as well as function together. By connecting the brassière in this manner to the corset, a smooth even construction is presented and the brassière is held from rising at the rear. If desired, a hook or other means could be used for tying the brassière to the lacing of the corset at the front.

In Figures 9 and 10, a modified form of the invention is shown wherein a wrap around corset is disclosed provided with a number of straps 7 mounted on a suitable strip 5 as in the preferred form of the invention. The strip 5 is connected with a section 19 of the corset so as to act as the upper end thereof and hold the strap 7 as shown in Figure 3 whereby the rear part of the brassiere 14 may be connected thereto by suitable holding members 13. In this form of the invention, as well as that shown in Figure 3, the various pockets 12 are arranged vertically one above the other so that the lower edge of the brassiere may be adjusted to occupy different heights and in this way accommodate a long waisted or short waisted person. It is to be understood that the brassiere is connected to the corset before either the brassiere or corset is placed in position on a person. Preferably, when using the garments as shown in Figures 1 and 2, the corset is first placed in position and properly laced. After this has been done the brassiere is placed in position around the body and fastened, as for instance, by a row of hooks and eyes.

What I claim is:

A combined brassiere and corset, comprising a corset body, a plurality of looped members or straps carried by the corset body at the rear and near the upper edge, means for dividing said straps into sections so as to present substantial horizontal passage-ways arranged at different heights when the corset is in use, a brassiere body, a plurality of looped members connected with the brassiere body at the rear near the lower edge, and a flexible member extending through the looped members of the brassiere and through any of said passageways whereby the brassiere may be connected to the corset body at different heights.

JOSEPH JULIUS KISPERT.